United States Patent
Zhou et al.

(10) Patent No.: US 9,497,769 B1
(45) Date of Patent: Nov. 15, 2016

(54) ALLOCATING CARRIERS IN A WIRELESS COMMUNICATION SYSTEM

(75) Inventors: Yu Zhou, Herndon, VA (US); Daniel Vivanco, Reston, VA (US); Kyounghwan Lee, Herndon, VA (US); Aik Chindapol, Washington, DC (US)

(73) Assignee: Sprint Spectrum L.P., Overland Park, KS (US)

( * ) Notice: Subject to any disclaimer, the term of this patent is extended or adjusted under 35 U.S.C. 154(b) by 753 days.

(21) Appl. No.: 13/445,334

(22) Filed: Apr. 12, 2012

(51) Int. Cl.
*H04W 4/00* (2009.01)
*H04W 72/12* (2009.01)

(52) U.S. Cl.
CPC ..... *H04W 72/1226* (2013.01); *H04W 72/1247* (2013.01)

(58) Field of Classification Search
CPC ............... H04W 72/1247; H04W 72/1242; H04W 72/1236; H04W 52/281; H04W 52/26; H04W 28/20; H04W 28/0257; H04W 28/0268; H04W 28/16; H04W 28/18; H04W 28/22; H04W 28/24; H04W 28/26; H04W 72/1231
USPC ............... 370/232–235, 358, 391, 395.61, 370/395.64, 395.65, 329
See application file for complete search history.

(56) References Cited

U.S. PATENT DOCUMENTS

| | | | | |
|---|---|---|---|---|
| 5,923,650 A * | 7/1999 | Chen et al. | | 370/331 |
| 6,335,922 B1 * | 1/2002 | Tiedemann et al. | | 370/335 |
| 7,907,972 B2 * | 3/2011 | Walton et al. | | 455/562.1 |
| 8,014,784 B2 * | 9/2011 | Cho | | H04L 1/0026 370/338 |
| 8,032,145 B2 * | 10/2011 | Ji | | 455/450 |
| 8,059,589 B2 * | 11/2011 | Ji et al. | | 370/329 |
| 8,687,576 B2 * | 4/2014 | Brannstrom | | H04W 28/10 370/329 |
| 8,755,358 B2 * | 6/2014 | Kishigami | | H04B 7/0695 370/334 |
| 9,031,080 B2 * | 5/2015 | Hafeez | | H04B 7/024 370/329 |
| 2002/0183084 A1 * | 12/2002 | Wu et al. | | 455/509 |
| 2003/0013451 A1 * | 1/2003 | Walton | | 455/447 |
| 2003/0058881 A1 * | 3/2003 | Wu | | H04L 1/0002 370/444 |
| 2003/0123425 A1 * | 7/2003 | Walton et al. | | 370/341 |
| 2003/0135632 A1 * | 7/2003 | Vrzic | | H04L 47/14 709/231 |
| 2004/0160914 A1 * | 8/2004 | Sarkar | | 370/329 |

(Continued)

*Primary Examiner* — Guang Li

(57) ABSTRACT

In systems and methods of allocating carriers in a wireless communication network, a plurality of wireless devices in communication with an access node is ranked in a first ranking according to a required data rate of each wireless device. A carrier metric is determined for each of a plurality of carriers of the access node according to an actual data rate of each of the carriers and the required data rate of each wireless device, and each of the carriers is ranked in a second ranking for each of the plurality of wireless devices according to the determined carrier metric of each of the plurality of carriers. A first wireless device is selected from the first ranking, and a carrier from the second ranking is allocated to the selected first wireless device when the carrier provides the required data rate of the selected first wireless device.

20 Claims, 5 Drawing Sheets

(56) References Cited

U.S. PATENT DOCUMENTS

| | | | |
|---|---|---|---|
| 2004/0203968 A1* | 10/2004 | Gopalakrishnan | H04W 52/24 455/512 |
| 2005/0030953 A1* | 2/2005 | Vasudevan et al. | 370/395.4 |
| 2005/0085235 A1* | 4/2005 | Park | H04W 72/06 455/450 |
| 2005/0159166 A1* | 7/2005 | Jonsson et al. | 455/452.2 |
| 2006/0013245 A1* | 1/2006 | Abedi | 370/433 |
| 2006/0072567 A1* | 4/2006 | Casaccia et al. | 370/389 |
| 2006/0146721 A1* | 7/2006 | Attar et al. | 370/238 |
| 2006/0153216 A1* | 7/2006 | Hosein | H04L 1/0002 370/412 |
| 2006/0159013 A1* | 7/2006 | Lee | H04L 5/1446 370/229 |
| 2006/0224763 A1* | 10/2006 | Altunbasak et al. | 709/231 |
| 2007/0026861 A1* | 2/2007 | Kuhn et al. | 455/436 |
| 2007/0189320 A1* | 8/2007 | Wu et al. | 370/437 |
| 2007/0218918 A1* | 9/2007 | Liu | H04W 72/1226 455/452.1 |
| 2007/0263528 A1* | 11/2007 | Mukherjee | 370/208 |
| 2008/0031277 A1* | 2/2008 | Walter et al. | 370/469 |
| 2008/0144570 A1* | 6/2008 | Hsu et al. | 370/329 |
| 2008/0232320 A1* | 9/2008 | Lee | H04W 16/10 370/329 |
| 2008/0232341 A1* | 9/2008 | Andrews | H04W 72/1252 370/345 |
| 2009/0097412 A1* | 4/2009 | Jain et al. | 370/252 |
| 2009/0103488 A1* | 4/2009 | Zhu et al. | 370/330 |
| 2009/0196196 A1* | 8/2009 | Ghosh | H04L 5/0044 370/252 |
| 2009/0207811 A1* | 8/2009 | Zhu et al. | 370/332 |
| 2009/0279486 A1* | 11/2009 | Kishigami | H04B 7/0695 370/329 |
| 2010/0056172 A1* | 3/2010 | Iwamura et al. | 455/453 |
| 2011/0053513 A1* | 3/2011 | Papakostas et al. | 455/63.1 |
| 2011/0075556 A1* | 3/2011 | Li | 370/230 |
| 2011/0075744 A1 | 3/2011 | Laselva et al. | |
| 2011/0092219 A1* | 4/2011 | Damnjanovic et al. | 455/450 |
| 2011/0158194 A1* | 6/2011 | Musikka et al. | 370/329 |
| 2012/0003943 A1* | 1/2012 | Marinier et al. | 455/73 |
| 2012/0057478 A1* | 3/2012 | Brannstrom | H04W 72/10 370/252 |
| 2012/0057541 A1* | 3/2012 | Choi | H04W 72/10 370/329 |
| 2012/0120823 A1* | 5/2012 | Kotecha | 370/252 |
| 2012/0120880 A1* | 5/2012 | Lee | H04W 72/02 370/329 |
| 2012/0163173 A1* | 6/2012 | Satapathy et al. | 370/232 |
| 2012/0188894 A1* | 7/2012 | Huschke | H04L 1/0002 370/252 |
| 2012/0230267 A1* | 9/2012 | Sundaresan et al. | 370/329 |
| 2012/0307786 A1* | 12/2012 | Zellner et al. | 370/329 |
| 2013/0203398 A1* | 8/2013 | Callard et al. | 455/418 |

* cited by examiner

ALLOCATING CARRIERS IN A WIRELESS COMMUNICATION SYSTEM

TECHNICAL BACKGROUND

Wireless communication devices can be capable of communicating with a wireless communication system through more than one frequency band or carrier. For example, a multimode wireless device can communicate with a multiband/multicarrier system through a plurality of carriers. The resources, such as air interface resources, required to provide services to the wireless device may vary depending in part on the carrier or carriers available and their characteristics. An overall ability to provide services to a wireless device will thus depend, at least in part, on carrier selection and allocation to the wireless device. In a communication system capable of supporting multiple bands and/or carriers to communicate with a wireless device, such as a multiband/multicarrier system, a large number of possible combinations of allocated carriers can be generated, especially as the number of wireless devices serviced in an area increases.

OVERVIEW

In systems and methods of allocating carriers in a wireless communication network, a plurality of wireless devices in communication with an access node is ranked in a first ranking according to a required data rate of each wireless device. A carrier metric is determined for each of a plurality of carriers of the access node according to an actual data rate of each of the plurality of carriers and the required data rate of each wireless device, and each of the plurality of carriers is ranked in a second ranking for each of the plurality of wireless devices according to the determined carrier metric of each of the plurality of carriers. A first wireless device with the lowest required data rate is selected from the first ranking, and a carrier from the second ranking is allocated to the selected first wireless device when the carrier provides the required data rate of the selected first wireless device.

DETAILED DESCRIPTION

In operation, wireless devices in communication with an access node are ranked according to a required data rate of each wireless device into a first ranking. A carrier metric is determined for each of a plurality of carriers of the access node according to an actual data rate of each of the plurality of carriers and the required data rate of each wireless device, and based on the determined carrier metric each of the plurality of carriers is ranked in a second ranking for each of the plurality of wireless. A first wireless device with the lowest required data rate is selected from the first ranking, and a carrier from the second ranking is allocated to the selected first wireless device when the carrier provides the required data rate of the selected first wireless device. In an embodiment, the carrier allocated from the second ranking to the selected first wireless device is the carrier with the highest carrier metric of the second ranking which can provide the required data rate of the first wireless device. In an embodiment, when the carrier in the second ranking with the highest carrier metric does not satisfy the required data rate of the first wireless device, a carrier with the next highest carrier metric of the second ranking is evaluated as to whether it meets the required data rate of the first wireless device.

Figure 1:
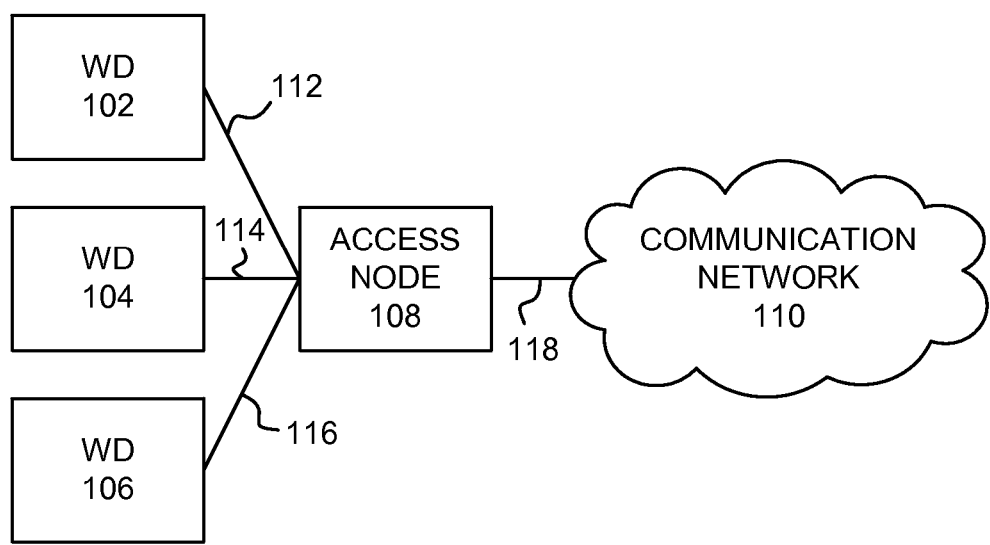
FIG. 1 illustrates an exemplary communication system to allocate carriers in a wireless communication network.

FIG. 1 illustrates an exemplary communication system 100 to allocate carriers in a wireless communication system comprising wireless devices 102, 104, 106, access node 108, and communication network 110. Examples of wireless devices 102, 104, 106 can include a cell phone, a smart phone, a computing platform such as a laptop, palmtop, or tablet, a personal digital assistant, an internet access device, or other device capable of wireless communication, including combinations thereof. Wireless devices 102, 104, 106 are in communication with access node 108 through communication links 112, 114, 116, respectively. Though FIG. 1 illustrates three wireless devices, in operation communication system 100 can comprise more or fewer wireless devices.

Access node 108 is a network node capable of providing wireless communications to wireless devices 102, 104, 106, and can be, for example, a base transceiver station or an eNodeB device. Although a single access node 108 is illustrated in FIG. 1, wireless devices 102, 104, 106 can be in communication with more than one access node. Access node 108 is in communication with communication network 110 through communication link 118.

Communication network 110 can be wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information, for example, to support voice communications by a wireless device such as wireless devices 102, 104, 106. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116 and 118 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

Communication system 100 can support wireless communication with wireless devices 102, 104, 106 through more than one frequency band or carrier. For example, communication system 100 can be a multiband/multicarrier communication system. The resources, such as air interface resources, required to provide services to the wireless device may vary depending in part on the carrier or carriers available and their characteristics. In embodiments, communication system 100 can support the provision of services to wireless devices 102, 104, 106, by using various quality of service (QoS) schemes. (QoS is generally understood as schema to provide at least a minimum predetermined level of network service and/or performance, which can be measured in a variety of ways.) So-called guaranteed services, such as video applications and voice applications to name but two, are typically latency sensitive services which require a sustainable minimum bit rate (and possibly a sustainable maximum bit rate as well). If available network resources are insufficient to meet minimum application requirements, services cannot be provided (for example, a call request can be rejected, or a requested service may be unavailable). The availability of air interface resources may vary according to, among other things, an assigned modulation and coding scheme of a carrier. Furthermore, when the number of wireless devices and carriers are large, the computational complexity of determining an appropriate carrier for each wireless device is high.

In operation, a plurality of wireless devices 102, 104, 106 in communication with access node 108 are ranked in a first ranking according to a required data rate of each wireless device. A carrier metric can be determined for each of a plurality of carriers of access node 108 according to an actual data rate of each of the plurality of carriers and the required data rate of each wireless device. Each of the plurality of carriers can be ranked in a second ranking for each of the plurality of wireless devices according to the determined carrier metric of each of the plurality of carriers. A first wireless device can be selected with the lowest required data rate from the first ranking, and a carrier from the second ranking can be allocated to the selected first wireless device when the carrier provides the required data rate of the selected first wireless device.

Figures 2, 3:
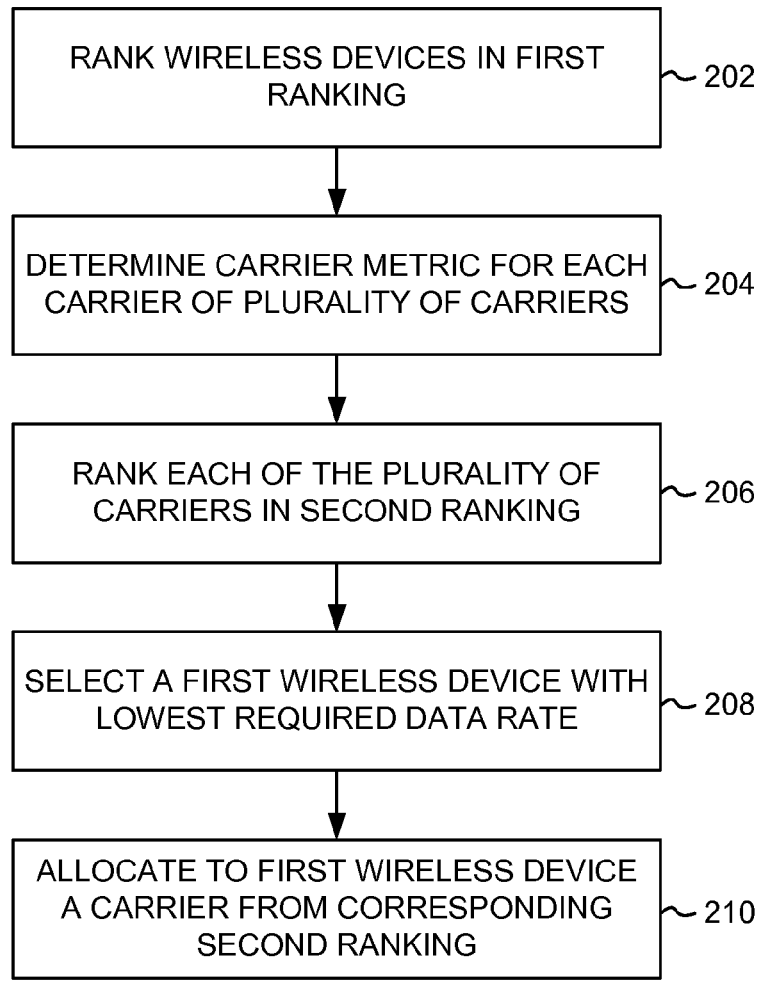
FIG. 2 illustrates an exemplary method of allocating carriers in a wireless communication network.
FIG. 3 illustrates an exemplary ranking of wireless devices and carriers in a communication system.

FIG. 2 illustrates an exemplary method of allocating carriers in a wireless communication network. In operation 202, wireless devices 102, 104, 106 in communication with access node 108 are ranked in a first ranking. Wireless devices 102, 104, 106 can be ranked according to their demand, for example, for services requiring a minimum data rate. FIG. 3 illustrates an exemplary ranking of wireless devices and carriers in a communication system. As an example, each of wireless devices WD1-WD4 can be using guaranteed and/or latency sensitive services, and thus each of WD1-WD4 will require a minimum data rate depending on the particular guaranteed service used by that wireless device. As illustrated in FIG. 3, wireless devices WD1-WD4 are ranked according to the size of their respective minimum bit rate requirements, in this case from smallest (WD1) to largest (WD4).

In operation 204, a carrier metric is determined for each of a plurality of carriers of the access node according to an actual data rate of each of the plurality of carriers and the required data rate of each wireless device. For example, five carriers C1-C5 may be supported by access node 108, collectively comprising a total amount of radio frequency (RF) resources. Each wireless device will consume a certain amount of RF resources. Also, the amount of RF resources consumed by each wireless device may change over time, for example, based on the modulation and coding scheme assigned to a particular carrier, as well as the available network resources of a given carrier. For each combination of a wireless device (from among WD1-WD4) and a carrier (from among C1-C5), a carrier metric can be determined based on the actual data rate usage of each combination and the minimum data requirement of each wireless device. Each of the plurality of carriers C1-C5 can be ranked according to their respective determined carrier metric (operation 206).

In operation 208, a first wireless device with the lowest required data rate (for example, WD1 in FIG. 3) can be selected from the first ranking, and a carrier C which provides the required data rate of WD1 can be allocated to WD1 from the second ranking (operation 210).

The ranking of carriers can change over time based on the allocation of carriers to each wireless device and the remaining resources available for each carrier. For example, FIG. 3 illustrates that carriers C1, C2, C3 and C5 are potential candidates to be assigned to WD1. Carrier C4 has been eliminated as a candidate, for example, because it cannot meet the minimum required data rate for WD1. The candidate carriers have been ranked in an order C3, C1, C5, C2. A carrier will be assigned first to WD1, then to WD2, WD3 and WD4 in sequence according to the first ranking. In an embodiment, as carriers are assigned, insufficient resources may remain in an assigned carrier to meet the requirements of one or more subsequently ranked wireless devices. In such case, a carrier may be dropped as a candidate for one or more subsequent wireless devices, and the ranking of carriers for the one or more subsequent wireless devices can be changed accordingly.

Figure 4:
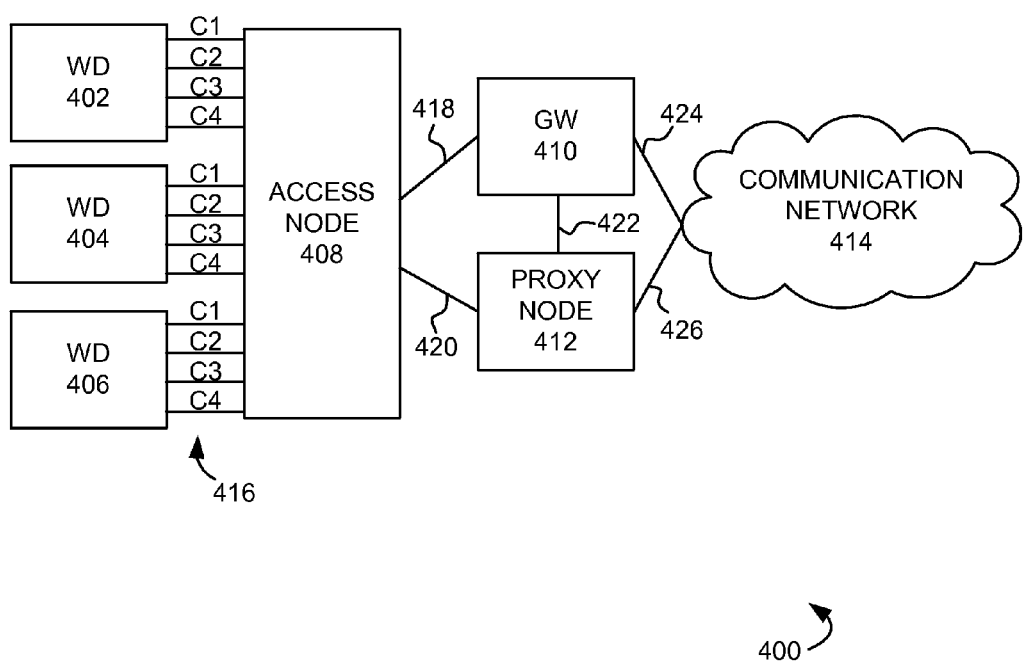
FIG. 4 illustrates another exemplary communication system to allocate carriers in a wireless communication network.

FIG. 4 illustrates another exemplary communication system to allocate carriers in a wireless communication network comprising wireless devices 402, 404, 406, access node 408, gateway 410, proxy node 412, and communication network 414. Examples of wireless devices 402, 404, 406, can include a cell phone, a smart phone, a computing platform such as a laptop, palmtop, or tablet, a personal digital assistant, an internet access device, or other device capable of wireless communication, including combinations thereof. Wireless devices 402, 404, 406 are in communication with access node 408 through communication links 416. Communication links 416 are further illustrated as a plurality of carriers C1-C4, which represent the availability of carriers C1-C4 for assignment to wireless devices 402, 404, 406.

Access node 408 is a network node capable of providing wireless communications to wireless devices 402, 404, 406, and can be, for example, a base transceiver station or an eNodeB device. Although a single access node 408 is illustrated in FIG. 4, wireless devices 402, 404, 406 can be in communication with more than one access node. Access node 408 is in communication with gateway 410 through communication link 418, and with proxy node 412 through communication link 420. In addition, gateway 410 and proxy node 412 are in communication with each other through communication link 422. Gateway 410 and proxy node 412 are network nodes, each capable of supporting functionality to allocate carriers in communication system 400, and their inclusion in FIG. 4 is illustrative rather than a requirement of communication system 400. Gateway 410 and proxy node 412 can be standalone network nodes, or their functionality may be included in another network node. It should also be noted that access node 408 can also support the functionality to allocate carriers in communication system 400.

Gateway 410 and proxy node 412 are in communication with communication network 414 through communication links 424 and 426, respectively. Communication network 414 can be wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network is analogous to communication network 110 described above, and further description thereof is omitted for brevity.

Communication links 416, 418, 420, 422, 424, and 426 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 408, gateway 410, proxy node 412, and communication network 414 which are omitted for clarity, including additional processing nodes, routers, gateways, and physical and/or wireless data links for carrying data among the various network elements.

Figure 5:
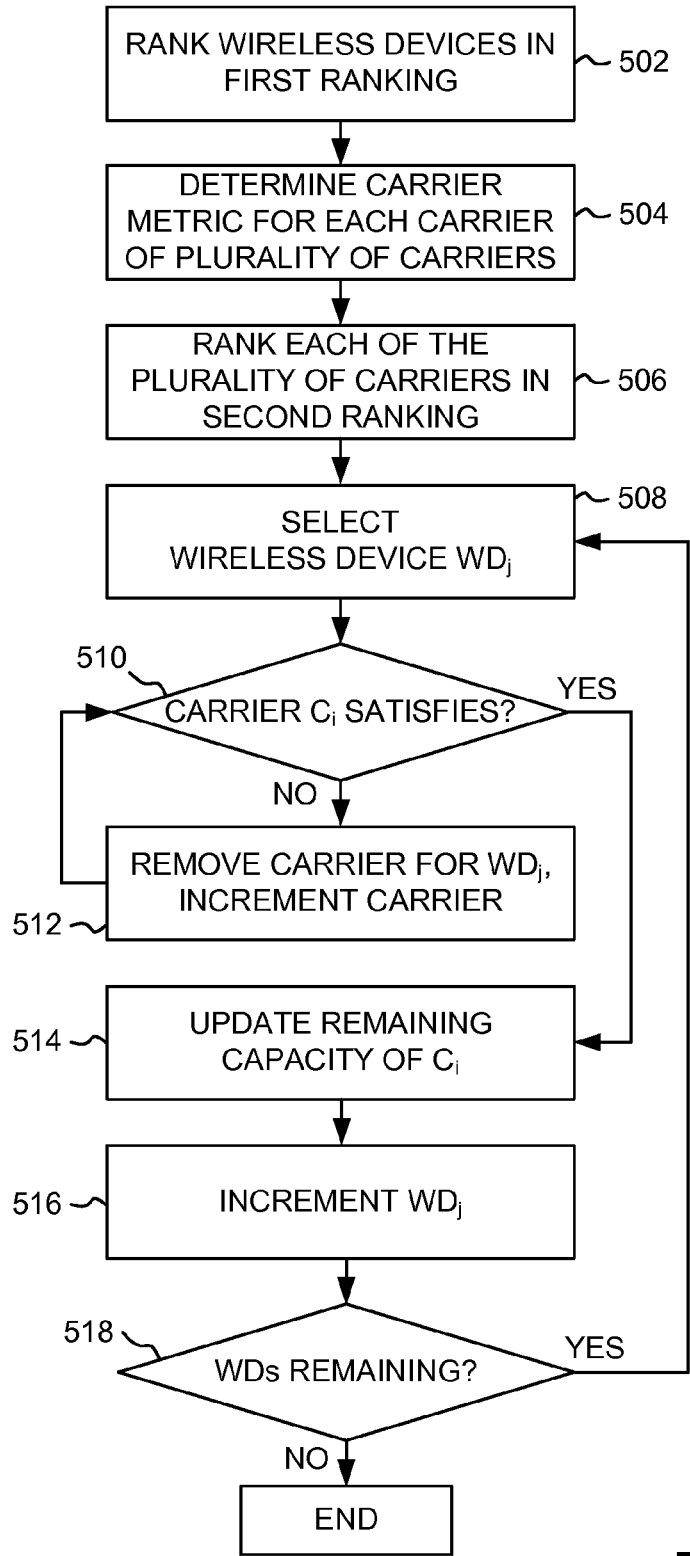
FIG. 5 illustrates another exemplary method of allocating carriers in a wireless communication network.

FIG. 5 illustrates another exemplary method of allocating carriers in a wireless communication network. In operation 502, wireless devices 402, 404, 406 in communication with access node 408 are ranked in a first ranking. Wireless devices 402, 404, 406 can be ranked according to their demand, for example, for services requiring a minimum bit rate. In an embodiment, wireless devices 402, 404, 406 can be members of a service group of wireless devices.

In operation 504, a carrier metric is determined for each of a plurality of carriers of access node 408 according to an actual data rate of each of the plurality of carriers and the required data rate of each wireless device. For example, carriers C1-C4 (that is, a carrier $C_i$) may be supported by access node 408, collectively comprising a total amount of RF resources. Each wireless device 402, 404, 406 (that is, each $WD_j$) will consume a certain amount of RF resources. Also, the amount of RF resources consumed by each wireless device may change over time, for example, based on the modulation and coding scheme assigned to a particular carrier, as well as the available network resources of a given carrier. For each combination of wireless device $WD_j$ and carrier $C_i$, a carrier metric can be determined based on the actual data rate usage of each combination ($R_{i,j}$) and the minimum data requirement of each wireless device ($r_j$). In an embodiment, the carrier metric can be expressed as follows:

$$CarrierMetric_{i,j} = \frac{R_{i,j}}{r_j} \qquad \text{(Equation 1)}$$

Each of the plurality of carriers C1-C4 can be ranked according to their respective determined carrier metric (operation 506). In an embodiment, a carrier is only considered a candidate for assignment to a wireless device if its carrier metric is greater than or equal to one (that is, in an embodiment, a carrier $C_i$ is considered as a candidate carrier for assignment if $CarrierMetric_{i,j} \geq 1$).

In operation 508, a first wireless device with the lowest required data rate (for example, WD1 in FIG. 3) can be selected from the first ranking, and candidate carriers for the first wireless device are considered in the order of the second ranking (operation 510). When the selected carrier does not meet the requirements of the first wireless device (operation 510-NO), then the carrier is removed from consideration for the first wireless device and the next carrier in the second ranking is considered (operation 512). When the selected carrier provides the required data rate of the first wireless device (operation 510-YES), that carrier is allocated to the first wireless device from the second ranking, and the carriers remaining to be allocated are updated for the remaining wireless devices (operation 514).

In operation 516, the next wireless device in the first ranking is determined (operation 516), and if any wireless devices $WD_j$ remain (operation 518-YES), carrier candidates for the remaining wireless devices are considered. When no wireless devices remain (operation 518-NO) the method ends. If any capacity of any carrier (for example, bandwidth) remains after operation 518-NO, remaining capacity can, for example, be allocated to wireless devices in a least demand-to-greatest demand order, to satisfy the greatest amount of overall air resource demand.

Accordingly, demand for air interface resources can be addressed based on the size of the demand by each wireless device, which, in an embodiment, can be addressed from smallest demand to largest demand.

Figure 6:
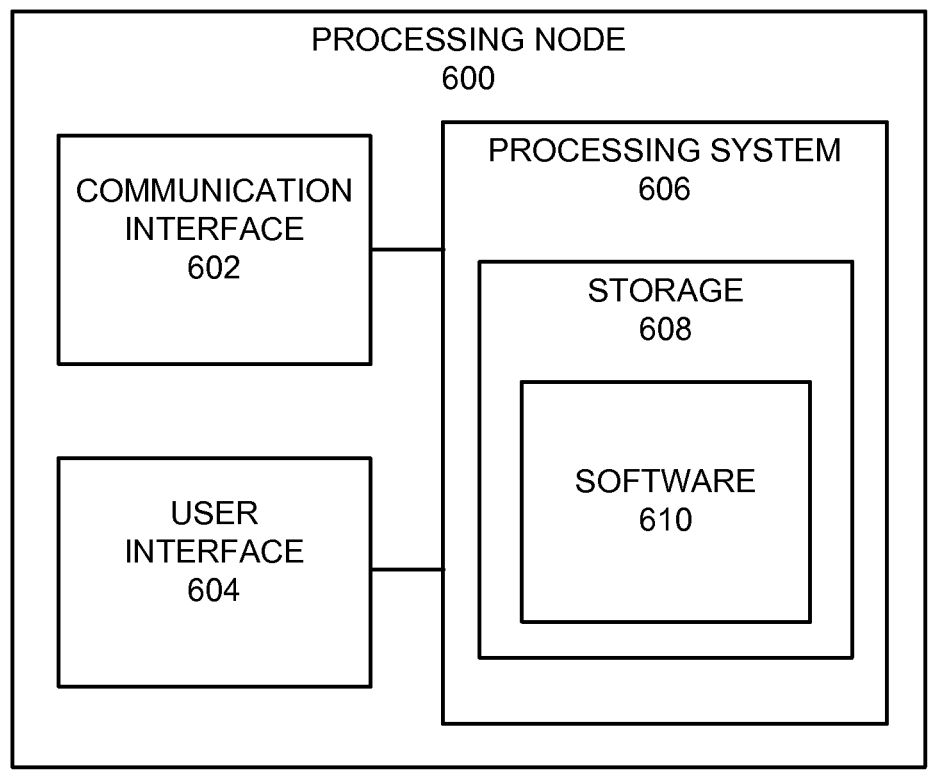
FIG. 6 illustrates an exemplary processing node.

FIG. 6 illustrates an exemplary processing node 600 comprising communication interface 602, user interface 604, and processing system 606 in communication with communication interface 602 and user interface 604. Examples of processing node 600 are gateway 410 and proxy node 412, as well as another appropriate network node. Communication interface 602 permits processing node 600 to communicate with a communication network such as communication networks 110 and 414 and with other network elements. User interface 604 permits the configuration and control of the operation of processing node 600.

Processing system 606 comprises storage 608. Storage 608 comprises a disk drive, flash drive, memory circuitry, or other memory device. Storage 608 can store software 610 which is used in the operation of the processing node 600. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of allocating carriers in a wireless communication network, comprising:
   ranking a plurality of wireless devices in communication with an access node in a first ranking according to a required data rate of each wireless device;
   determining a carrier metric for each of a plurality of carriers of the access node according to the required data rate of each wireless device communicating over each carrier and an actual data rate for each wireless device communicating over each carrier;
   ranking each of the plurality of carriers in a second ranking according to the determined carrier metric of each of the plurality of carriers;
   selecting a first wireless device with a lowest required data rate from the first ranking; and
   determining a carrier from the second ranking for the selected wireless device based on the required data rate for the selected wireless device and the determined carrier metrics for the carriers from the second ranking, wherein a carrier from the second ranking that cannot meet the required data rate of the first wireless device is removed from the second ranking; and
   allocating a carrier from the second ranking to the selected first wireless device such that the allocated carrier comprises a highest ranking from among the carriers of the second ranking that also provides the required data rate of the selected first wireless device.

2. The method of claim 1, further comprising:
   adjusting the carrier metric for the carrier allocated to the first wireless device based on the required data rate of the first wireless device and the actual data rate for the first wireless device;
   adjusting the second ranking according to the adjusted carrier metric;
   allocating to a second wireless device with the next lowest required data rate in the first ranking a carrier from the second ranking.

3. The method of claim 1, wherein allocating further comprises:
   determining that a bandwidth of the a carrier with a highest carrier metric of the second ranking does not satisfy the required data rate of the first wireless device; and
   allocating to the first wireless device a carrier with the next highest carrier metric of the second ranking.

4. The method of claim 1, wherein allocating the carrier of the second ranking to the selected first wireless device further comprises removing from the second ranking a carrier for which the carrier metric indicates that the carrier cannot meet the lowest required data rate of the first wireless device.

5. The method of claim 1, wherein the carrier metric is determined according to the actual data rate of a carrier per the required data rate of each wireless device of the first ranking.

6. The method of claim 1, further comprising:
   adjusting the first ranking when the required data rate of one of the wireless devices changes; and
   redetermining the carrier metric for each of the plurality of carriers according to the changed required data rate.

7. The method of claim 1, further comprising:
   redetermining the carrier metric for each of the plurality of carriers when one of the actual data rate of one of the carriers changes and a resource requirement of one of the carriers changes.

8. The method of claim 7, wherein the resource requirement of one of the carriers changes according to a modulation and coding scheme assigned to the one of the carriers.

9. The method of claim 1, wherein determining a carrier metric for each of a plurality of carriers of the access node further comprises:
   determining, for each carrier, the required data rate of each wireless device communicating over the carrier;
   determining, for each carrier, the actual data rate for each wireless device communicating over the carrier; and
   calculating, for each carrier, the carrier metric as a ratio of the determined actual data rates to the determined required data rates.

10. The method of claim 1, further comprising:
    removing from the second ranking one or more carrier that comprise a determined carrier metric that fails to meet a threshold.

11. A system for allocating carriers in a wireless communication network, comprising:
    a network node of the wireless communication system configured to
      rank a plurality of wireless devices in communication with an access node in a first ranking according to a required data rate of each wireless device;

determine a carrier metric for each of a plurality of carriers of the access node according to the required data rate of each wireless device communicating over each carrier and an actual data rate for each wireless device communicating over each carrier;

rank each of the plurality of carriers in a second ranking according to the determined carrier metric of each of the plurality of carriers; and determine a carrier from the second ranking for the selected wireless device based on the required data rate for the selected wireless device and the determined carrier metrics for the carriers from the second ranking, wherein a carrier from the second ranking that cannot meet the required data rate of the first wireless device is removed from the second ranking; and allocate a carrier from the second ranking to the selected first wireless device such that the allocated carrier comprises a highest ranking from among the carriers of the second ranking that also provides the required data rate of the selected first wireless device.

12. The system of claim 11, wherein the network node is further configured to:

adjust the carrier metric for the carrier allocated to the first wireless device based on the required data rate of the first wireless device and the actual data rate for the first wireless device;

adjust the second ranking according to the adjusted carrier metric;

allocate to a second wireless device with the next lowest required data rate in the first ranking a carrier from the second ranking of the second wireless device.

13. The system of claim 11, wherein the network node is further configured to:

determine that a bandwidth of the carrier with a highest carrier metric of the second ranking does not satisfy the required data rate of the first wireless device; and allocate to the first wireless device a carrier with the next highest carrier metric of the second ranking.

14. The system of claim 11, wherein the network node is further configured to:

remove from the second ranking a carrier for which the carrier metric indicates that the carrier cannot meet the lowest required data rate.

15. The system of claim 11, wherein the carrier metric is determined according to the actual data rate of a carrier per the required data rate of each wireless device of the first ranking.

16. The system of claim 11, wherein the network node is further configured to:

adjust the first ranking when the required data rate of one of the wireless devices changes; and redetermine the carrier metric for each of the plurality of carriers according to the changed required data rate.

17. The system of claim 11, wherein the network node is further configured to:

redetermine the carrier metric for each of the plurality of carriers when one of the actual data rate of one of the carriers changes and a resource requirement of one of the carriers changes.

18. The system of claim 17, wherein the resource requirement of one of the carriers changes according to a modulation and coding scheme assigned to the one of the carriers.

19. The system of claim 11, wherein determining a carrier metric for each of a plurality of carriers of the access node further comprises:

determining, for each carrier, the required data rate of each wireless device communicating over the carrier;

determining, for each carrier, the actual data rate for each wireless device communicating over the carrier; and calculating, for each carrier, the carrier metric as a ratio of the determined actual data rates to the determined required data rates.

20. The system of claim 11, wherein the network node is further configured to:

remove from the second ranking one or more carrier that comprise a determined carrier metric that fails to meet a threshold.

* * * * *